(12) United States Patent
Fossati et al.

(10) Patent No.: US 11,073,882 B2
(45) Date of Patent: Jul. 27, 2021

(54) DISPLAY DEVICE WITH POWER INPUTS (71) Applicant: HEWLETT-PACKARD DEVELOPMENT COMPANY, L.P., Spring, TX (US)

(72) Inventors: Humberto M. Fossati, Spring, TX (US); Wen Shih Chen, Taipei (TW); John W. Frederick, Spring, TX (US)

( * ) Notice: Subject to any disclaimer, the term of this patent is extended or adjusted under 35 U.S.C. 154(b) by 165 days.

(21) Appl. No.: 16/471,861

(22) PCT Filed: Dec. 20, 2016

(86) PCT No.: PCT/US2016/067751
§ 371 (c)(1),
(2) Date: Jun. 20, 2019

(87) PCT Pub. No.: WO2018/118022
PCT Pub. Date: Jun. 28, 2018

(65) Prior Publication Data
US 2020/0089296 A1 Mar. 19, 2020

(51) Int. Cl.
G06F 1/00 (2006.01)
G06F 1/26 (2006.01)
H02J 7/00 (2006.01)

(52) U.S. Cl.
CPC .............. *G06F 1/266* (2013.01); *G06F 1/263* (2013.01); *H02J 7/0063* (2013.01); *G09G 2330/021* (2013.01); *G09G 2330/12* (2013.01); *H02J 7/00* (2013.01)

(58) Field of Classification Search
CPC ........ G06F 1/266; G06F 1/263; H02J 7/0063; H02J 7/00; H02J 5/00; H02J 1/04; G09G 2330/021; G09G 2330/12; H04L 12/14
See application file for complete search history.

(56) References Cited

U.S. PATENT DOCUMENTS

| 8,504,853 | B2 | 8/2013 | Carlsen et al. |
| 8,661,268 | B2 | 2/2014 | Brooks et al. |
| 2009/0100275 | A1 | 4/2009 | Chang et al. |
| 2013/0145185 | A1 | 6/2013 | Brumley et al. |
| 2013/0305064 | A1 | 11/2013 | Fossati et al. |
| 2014/0223207 | A1* | 8/2014 | Du .................. G06F 1/3215 713/320 |
| 2015/0270733 | A1 | 9/2015 | Inha et al. |
| 2016/0139640 | A1 | 5/2016 | Hijazi et al. |
| 2016/0163480 | A1 | 6/2016 | Lester |
| 2016/0306408 | A1 | 10/2016 | Du et al. |
| 2017/0017283 | A1* | 1/2017 | Seo .................. G06F 1/266 |

OTHER PUBLICATIONS

USB Type-c Does It All: Data, Video and Power Delivery Over a Single Cable Connection, Jul. 28, 2015, < https://e2e.ti.com/blogs_/b/analogwire/archive/2015/07/28/usb-type-c-does-it-all-data-video-and-power-delivery-over-a-single-cable-connection >.

* cited by examiner

Primary Examiner — Xuxing Chen
(74) Attorney, Agent, or Firm — Brooks Cameron & Huebsch PLLC (57) ABSTRACT In an example, a display device with power inputs includes a first power input to receive a first amount of input power, a second power input to receive a second amount of input power, a power allocator to combine at least a portion of the first amount of power with at least a portion of the second amount of power to form a combined output power, and a universal serial bus (USB) port to output at least a portion of the combined output power to a peripheral device.

13 Claims, 6 Drawing Sheets

DISPLAY DEVICE WITH POWER INPUTS

BACKGROUND

Consumer electronic devices such as computers, laptops, mobile devices, music players, etc. may utilize power supplies to operate. Different consumer electronic devices may utilize a variety of different manufacturers to obtain such power supplies. Amounts of power provided by different power suppliers may vary. Connections used by the power suppliers and/or the consumer electronic devices may also vary.

DETAILED DESCRIPTION

A peripheral device such as a laptop can be coupled to and powered by a display device. For instance, a display device can output power via a universal serial bus (USB) port to a peripheral device coupled to the USB port. However, a display device may have a desired output power capability that is limited (e.g., limited to 15 Watts to 65 Watts) due to cost and/or size constraints, etc. As such, the USB port may not output enough power at a given time to satisfy a desired operational input power of the peripheral device (e.g., 100 Watts) Coupled to the USB port. Consequently, the peripheral device may not operate or may have to utilize a separate source of power such as a power adaptor coupled to the peripheral device to satisfy the desired operational input power of the peripheral device.

Accordingly, the disclosure is directed to display devices with power inputs. For example, a display device with power inputs can include a first power input to receive a first amount of input power, a second power input to receive a second amount of input power, a power allocator to combine at least a portion of the first amount of power with at least a portion of the second amount of power to form a combined output power, and a USB port to output at least a portion of the combined output power to a peripheral device.

Notably, the combined output power (e.g., 110 W) of the display device can be greater than the limited desired output power capability of the display. As such, the display device can desirably output enough power via an individual cable (e.g., via a type-C USB port) to satisfy (meet or exceed) a desired operational power of the peripheral device, in contrast to other approaches that may rely on an additional power cable (e.g., from a power supply) being directly coupled to a peripheral device.

Figure 1:
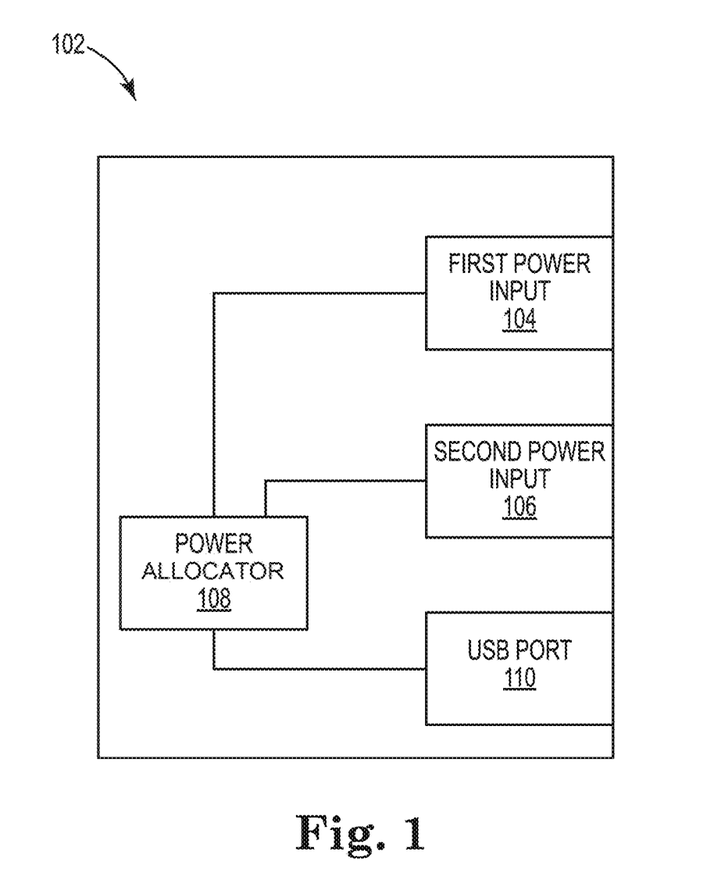
FIG. 1 illustrates an example of a display device with power inputs in accordance with the disclosure.

FIG. 1 illustrates an example of a display device 102 with power inputs in accordance with the disclosure. As illustrated in FIG. 1, the display device 102 can include a first power input 104, a second power input 106, a power allocator 108, and a USB port 110, among other possible components including those described herein.

As used herein, a power input such as the first power input 104 refers to circuitry capable of receiving power when coupled in a wired and/or wireless manner to a source of power. Examples of power inputs include alternating current (AC)/direct current (DC) power inputs and/or DC/DC power inputs, among other types of power inputs, AC/DC power inputs can receive AC power and convert at least some of the received AC power to DC power that can be utilized by various components of an electronic device such as a component in a display device. DC/DC power inputs can receive DC power of a given voltage and convert the received DC power to DC power at a different voltage to be utilized by components of an electronic device, among other possibilities including those where at least a portion of the received DC power is not converted to a different voltage but instead provided to components of an electronic device at the given voltage of the received DC power. Examples of sources of power include power supplies, power cables, inductive power transmitting devices such as inductive power mats, among other types of power inputs.

As used herein, a display device refers to an electronic device that can display content. Examples of display devices include computer monitors, televisions, and/or video projectors, etc. In some examples, the electronic device is without a battery. For instance, in various example, the display device can be a computer monitor that does not include a battery. That is, the first power input or the second power input, as detailed herein, are not analogous to a battery, nor do the first power input or the second power input derive power from a battery or other component within a housing of the display device. For example, the first and second power inputs 104, 106 may each receive power from external power sources.

Various components of the display device 102 can be at least partially housed within a housing, as described herein, of the display device 102. Examples of components of the display device 102 include a display such as a liquid crystal display, a backlight, the power allocator 108, a processing resource, a memory resource, and/or or a graphics card, among other possible components. The components of the display device 102 can be powered with an amount of power provided via the first power input 104 and/or via the second power input 106 to the display device 102. Thus, at least some of the amount of power provided via the first power input 104 and/or via the second power input 106 to the display device 102 can be consumed by the display device 102 itself.

In addition, the amount of power provided via the first power input 104 and/or via the second power input 106 to the display device can be output to power peripheral devices. As used herein, peripheral devices refer to electronic devices such as computers, laptops, mobile devices, music players, etc. that utilize power to operate. It is noted, that while peripheral devices may utilize a variety of different amounts of power and/or different types of connections or power supplies, the display device with two inputs, as described herein, can desirable provide a simplistic manner of coupling the peripheral device via an individual cable (without having to utilize an additional cable/source of power for the peripheral device to the display device and yet provide sufficient power to the peripheral device to satisfy a desired operating power of the peripheral device). That is, in contrast to some display devices that have one power input and a desired output power capability that is limited (e.g., limited to 15 Watts to 65 Watts) display devices with power inputs, as described herein, can desirably provide a combined output power to satisfy a desired operating power (e.g., 100 Watts) of various peripheral devices without having to directly couple an additional source of power to the peripheral devices.

As used herein, combined output power refers to an amount of power aggregated from the inputs of the display device. For example, the combined output power can be equal to a sum of a first amount of power from the first power input 104 and a second amount of input power from the second power input 106. However, the disclosure is not so limited. Rather, while FIG. 1 illustrates a total of two power inputs in the form of the first power input 104 and the second power input 106, the total number of power inputs can be increased, for example to three power inputs, etc., to promote aspects of display devices with power inputs. In some examples, the combined output power can be reduced by an amount of power consumed by the display device itself. For example, the combined output power can be equal to a sum of a first amount of power from the first power input 104 and a second amount of input power from the second power input 106 less an amount of power consumed by the components of the display device 102 itself.

As the combined output power is derived from a plurality of power inputs, the amount of the combined output power can be greater than the first amount of power from the first input power or greater than the second amount of power from the second input power. For example, an amount of a combined output power can be equal to 100 Watts or greater while an amount of the first input power can be equal to 15 Watts to 65 Watts, among other possibilities. The combined power can be combined using various circuitry including switches, transistors, among other types of circuitry to promote combination of power from a plurality of power inputs into a combined output power.

As used herein, a power allocator refers to circuitry to combine power such as conditioned power received by the first power input 104 and/or power received by the second power input 106. The power allocator may allocate and distribute power between a first device (e.g., the display device 102) and a second device (e.g., the peripheral device 320 of FIG. 3). An example of a power allocator is described herein in greater detail with respect to FIG. 5.

The USB port 110 can be a type-C USB port, among other types of USB ports or other types of ports that can provide a data and power connection with a peripheral device when coupled to the peripheral device in a wired or wireless manner. While FIG. 1 illustrates an individual USB port in the form of USB port 110 it is understood that the display device can include any suitable total number of USB port or other types of port that can provide data and power to a peripheral device. For instance, the display device 102 can include at least two USB ports in some examples. In such examples, a combined output power can be allocated by the power allocator 108 between some or ail of the two or more USB ports depending upon a particular application and/or a total number of peripheral devices to couple to the two or more USB ports.

Figure 2:
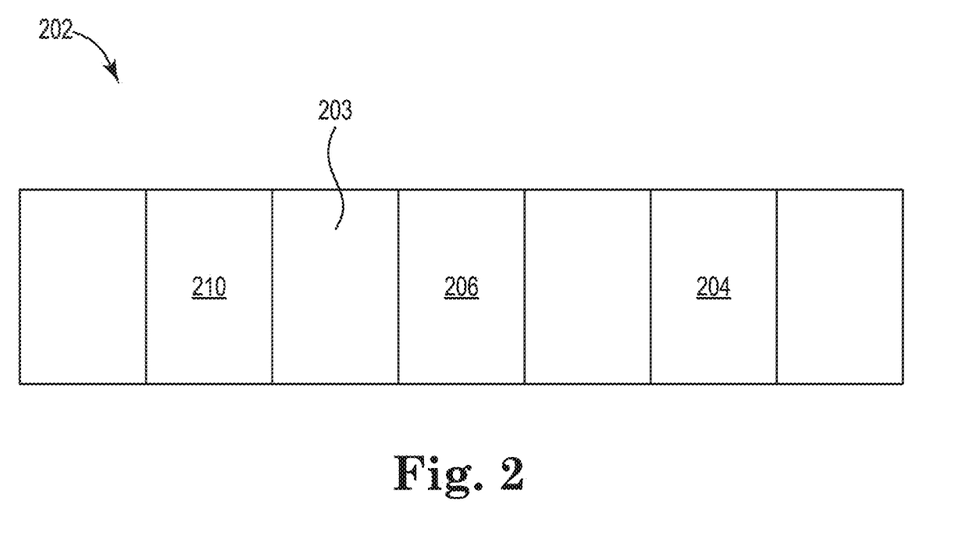
FIG. 2 illustrates a plan view of an example of a display device with power inputs in accordance with the disclosure.

FIG. 2 illustrates a plan view of an example of a display device 202 with power inputs in accordance with the disclosure. As illustrated in FIG. 2, the display device 202 can include a first power input 204, a second power input 206, and a USB port 210 in a housing 203 of the display device.

As illustrated in FIG. 2, the display device 202 includes a housing 203 forming at least a portion of an exterior surface of the display device 202. The housing 203 can be comprised of metal, plastic, and/or various composite materials, among other suitable materials. The housing 203 can house various components. For instance, each of the first power input 204, the second power input 204, and the USB port 210 can be included on the same surface (e.g., a side) of the housing 203 as illustrated in FIG. 2 although other configurations are possible.

As illustrated in FIG. 2, the first power input 204 is separate and physically distinct from the second power input 206. Similarly, the first power input 204 and the second power input 206 are each separate and physically distinct from the USB port 210.

Figure 3:
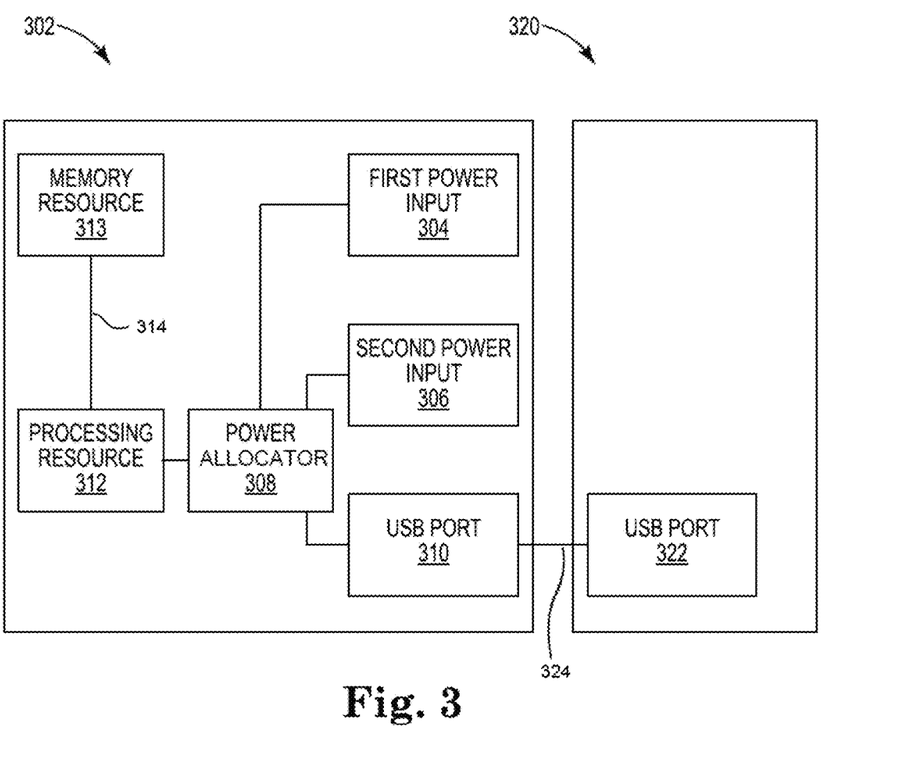
FIG. 3 illustrates an example of a display device with power inputs and an example of a peripheral device in accordance with the disclosure.

FIG. 3 illustrates an example of a display device 302 with power inputs and an example of a peripheral device 320 in accordance with the disclosure. As mentioned, the display device 302 can include a first power input 304, a second power input 306, a power allocator 308, and a USB port 310. Additionally, the display device 302 can include a processing resource 312 and a memory resource 313.

The processing resource 312, as used herein, can include a number of processors capable of executing instructions stored by a memory resource 313. Processing resource 312 can be integrated in an individual device or distributed across multiple devices. The instructions (e.g., computer-readable instructions (CRI)) can include instructions stored on the memory resource 313 and executable by the processing resource 312 to implement a desired function (e.g., instructions executable by the processing resource 312 to determine a first amount of input power received via a first power input of a display device, etc.).

Figure 4:
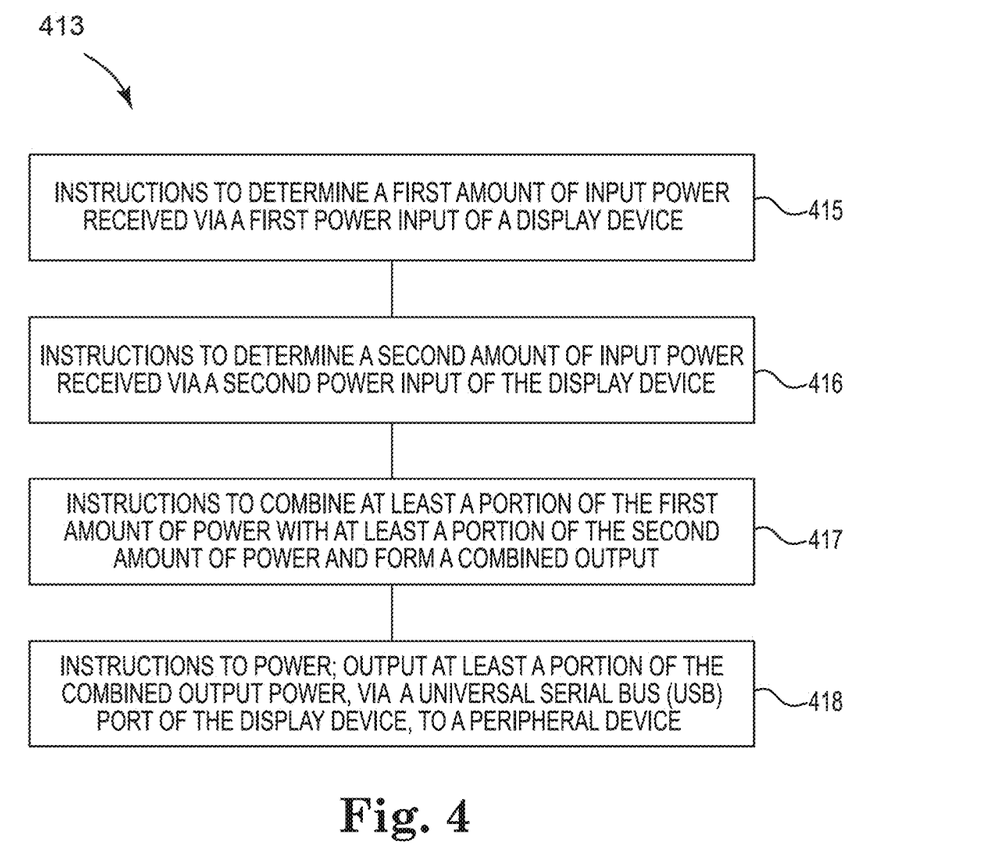
FIG. 4 illustrates an example of a memory resource suitable with a display device including power inputs in accordance with the disclosure.

The memory resource 313, as used herein, can include a number of memory components capable of storing non-transitory instructions, such as described in greater detail with respect to FIG. 4, that can be executed by processing resource 312. Memory resource 313 can be integrated in an individual device or distributed across multiple devices. Further, memory resource 313 can be fully or partially integrated in the same device as processing resource 312 or it can be separate but accessible to that device and processing resource 312.

The memory resource 313 can be in communication with the processing resource 312 via a communication link (e.g., path) 314. The communication link 314 can be local or remote to an electronic device associated with the processing resource 312. Examples of a local communication link 314 can include an electronic bus internal to a computing device where the memory resource 313 is one of volatile, non-volatile, fixed, and/or removable storage medium in communication with the processing resource 312 via the electronic bus.

The USB port 310 can couple to a USB cable 324. For example, the USB port 310 can be a type C USS port to couple to a type C USS cable. In such examples, the display device 302 can be coupled in a wired manner via the USB port 310 and the USB cable 324 to a corresponding USB port 322 such as a type C USB port included in the peripheral device 320.

FIG. 4 illustrates an example of a memory resource 413 suitable with a display device including power inputs in accordance with the disclosure. The memory resource 413 can be non-transitory computer-readable medium. As illustrated in FIG. 4, the memory resource 413 can include instructions to determine a first amount of input power received via a first power input of a display device, as illustrated at 415. Similarly, the memory resource 413 can include instructions to determine a second amount of input power received via a second power input of the display device, as illustrated at 416. For example, the instructions 415 and/or instructions 416 can cause a power allocator to determine a first amount of input power and/or determine a second amount of input power, as described herein.

The memory resource 413 can include instructions to combine at least a portion of the first amount of power with at least a portion of the second amount of power to form a combined output power, as illustrated at 417. As used herein, the instructions 417 to combine can directly cause combination of the first amount of power with the second amount of power or can be executed with the expectation of causing another device to cause combination of the first amount of power with the second amount of power. For example, the instructions 417 can cause a power allocator to combine at least a portion of the first amount of power with at least a portion of the second amount of power to form a combined output power, as described herein. As illustrated at 418, the memory resource 413 can include instructions to output at least a portion of the combined output power, via a USB port of the display device, to a peripheral device. As used herein, the instructions 418 to output can directly cause output of at least a portion of the combined output power or can be executed with the expectation of causing another device to output at least a portion of the combined output power.

In some examples, the memory resource 413 can include instructions to compare a voltage (e.g., 19.5 volts) of the first amount of input power to a voltage (e.g., 12.0 volts) of the second amount of input power and adjust the voltage of the first amount of input power and/or the voltage of the second amount of input power until the voltage of the first amount of input power is substantially equal to the voltage of the second amount of input power. Such voltage adjustment can promote combining the first amount of input power with the second amount of input power. For example, a current of the first amount of input power and/or a current of the second amount of input power can be adjusted by a power allocator until the voltage of the first amount of input power is substantially equal to the voltage of the second amount of input power, among other possibilities. Adjustment (e.g., stepping up a voltage) can be performed with various circuitry including transistors, switches, and/or other types of circuitry to promote such adjustment.

However, in some examples, the second power input is to receive the second amount of input power having a voltage (e.g., 19.5 volts) equal to a voltage (e.g., 19.5 volts) of the first input power. In such examples, voltage adjustment may not be employed.

In some examples, the memory resource 413 can include instructions to detect a type of peripheral device, determine a desired operating power of the peripheral device based on the determined type of peripheral device, and output the portion of the combined output power that is equal to the desired operating power of the peripheral device. For example, a type of peripheral device can be detected based upon a user input, based on an indication from the peripheral device, and/or based upon a voltage of a second power supply providing power to the second power input, among other possibilities. For instance, in some examples a voltage (100 Watts) of a power supply (e.g., second power supply) can indicate the type of peripheral device and/or a desired operating power (e.g., 100 Watts) of the peripheral device as the power supply may be provided by a manufacturer of the peripheral device.

Figure 5:
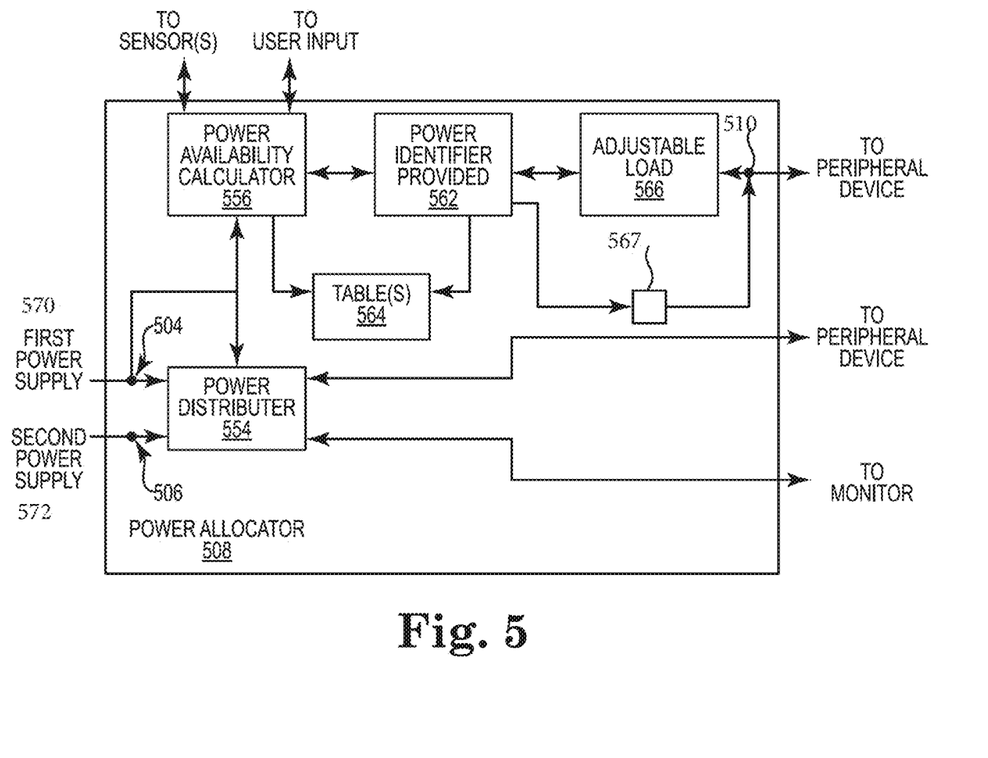
FIG. 5 illustrates a diagram of an example of a power allocator in accordance with the disclosure.

FIG. 5 illustrates a diagram of an example of a power allocator 508 in accordance with the disclosure. The power allocator 508 can allocate and distribute power between a first device (e.g., the display device 302 of FIG. 3) and a second device (e.g., the peripheral device 320 of FIG. 3). The power allocator 508 can include a power distributer 554, a power availability calculator 556, and power identifier provider 562, table(s) 564, an adjustable load 566, and a switch 567.

The power availability calculator 556 can determine a power provided to the power allocator 508 by a power supply via a first power input and/or a second power input and determines power allocations for the display device and the peripheral device. The power distributer 554 provides power to the display device and the peripheral device and the power identifier provider 562 provides an identifier of the power allocation to the peripheral device. The power availability calculator 556 can also adjust the power allocations between the display device and the peripheral device based on actual power consumption at the display device.

The power received (from the first power input and/or the second power input) by the power allocator 508 may be a fixed amount (e.g., 150 watts) or may vary. For example, the power received can vary based on a type of power supply (not shown) used (e.g., a first power supply may provide 150 Watts of power and a second power supply may provide 180 Watts of power) and/or can vary upon whether power is provided to the first power input 504 and/or the second power input 506. The power allocator 508 determines an amount of conditioned power received from the first power input 504 and/or the second power input 506. For example, power allocator can determine an amount of conditioned power received from a first power supply coupled to the first power input 504 and an amount of conditioned power received from a second power supply to the second power input 506. That is, the first power supply 570 can be coupled to the first power input 504 at the same time the second power supply 572 is coupled to the second power input 506. For instance, the first power supply 570 can be a power supply provided by a manufacture of the display device while the second power supply 572 can be a power supply provided by a manufacturer of a peripheral device, among other possibilities.

To determine the amount of power received, the power allocator 508 can measure a load at the first power input 504 and/or a load at the second power input when coupled to a corresponding power supply and use the measured load(s) to determine the conditioned power. In such examples, the power allocator 508 stores a power identification table listing a range of loads and power values corresponding to the loads. For example, if the power allocator 508 measures a load of 130 kilo-ohms (k$\Omega$), the power allocator 508 may use the power identification table as a lookup table to determine that 150 W of power corresponds to the 130 k$\Omega$ load. A power supply may, for example, include a 130 k$\Omega$ resistor within the power supply that the power allocator 508 may detect to identify the power supply as providing 150 W of power. In some examples, the power allocator 508 may measure a voltage and/or a current output by a power supply and calculate the power using the equation P=IV (power equals the product of current (I) and voltage (V)).

Once the power allocator 508 determines the amount of power (the first amount of power and/or the second amount of power) received by the first power input 504 and/or the second power input 506, the power allocator 508 can combine the first amount of input power with the second amount of input power and determine how to allocate the combined output power between the display device and a peripheral device. The power allocator 508 may determine how to allocate the power between the display device and a peripheral device in any of a variety of ways. For example, the power allocator 508 may set the power allocation for the peripheral device to a fixed amount (e.g., 90 W). In some examples, the power allocator 508 sets the power allocation for the display device to a fixed amount (e.g., 60 W). In some examples, a user input may be used to allow a user to determine how to allocate the power between the display device and the peripheral device. Once the power allocator 508 has determined how to allocate the power between the display device and the peripheral device, the power allocator 508 distributes power to the display device and the peripheral device. In some examples, the power allocator 508 can determine how to allocate power between the display device and peripheral device based on digital messages received from the display device and/or from the peripheral device. For instance, the power allocator 508 can negotiate and allocate power between the display device and the peripheral devices based on digital messages received from each of the display device and the peripheral device.

The power allocator 508 provides data (e.g., an identifier) corresponding to the determined power allocation for the peripheral device to the peripheral device. For example, if the power allocator 508 is to provide the peripheral device with 90 W of power, the power allocator 508 also provides an identifier of that 90 W to the peripheral device. The peripheral device power distributer (not shown) in the peripheral device can use the identifier to identify a maximum amount of power to be used by the peripheral device and to determine how to allocate power use within the peripheral device. For example, if the identifier indicates that 90 W of power is being provided to the peripheral device, the peripheral device power distributer may determine how to allocate that 90 W of power between processing at the peripheral device (e.g., to allow a user to use the peripheral device), providing a certain screen brightness at the peripheral device, charging a battery at the peripheral device, etc., so that power use at the peripheral device does not exceed the power allocation identified by the power allocator 508.

To provide the identifier of the power allocation for the peripheral device, the power allocator 508 places and/or adjusts a load on the USB port 510 to the peripheral device indicative of the power allocation. As described above, the power allocator 508 can store the power identification table listing loads and power values corresponding to the loads. The power allocator 508 can use this power identification table to determine the load to be placed on the USB port 510 to the peripheral device. The power allocator 508 can place and/or adjust a load on the USB port 510 to the peripheral device that corresponds to the power to be allocated to the display device. For example, if the power allocator 508 is to allocate 60 W of power to the display device, the power allocator 508 uses the power identification table to determine that the load corresponding to 60 W is 164 kΩ and the power allocator 508 places and/or adjusts the load on the USB port to the peripheral device to 164 kΩ. The power allocator 508 takes into account the load from the first power supply 570 and/or the second power supply 572 and adjusts the load on the USB port 510 such that the total load measured by the peripheral device power distributer will correspond to the power allocated to the peripheral device.

The power allocator 508 can adjust the power allocations provided to the display device and the peripheral device based on power use at the display device. Sensor(s) (not shown) can measure actual power consumption by components of the display device and provide the actual power consumption to the power allocator 508. The power allocator 508 may use the actual power consumption collected by the sensor(s) to determine if more or less power should be provided to the display device. For example, if less power is being used by the display device than the power allocated to it, the power allocator 508 can reduce the power allocated to the display device and increase the power allocated to the peripheral device. The power allocator 508 may check the actual power consumption of the display device periodically or aperiodically.

The power allocator 508 may dictate the actual power consumption to be a certain threshold value higher and/or lower than the power allocated to the display device before adjusting set power allocations. Dictating the actual power consumption to be a certain threshold value higher and/or lower than the current power allocation prevents the power allocator 508 from too frequently (e.g., constantly) adjusting the power allocations to the display device and the peripheral device. The power allocator 508 may adjust the power allocations to the display device and the peripheral device based on the user input. For example, a user may use the user input to instruct the power allocator 508 to increase or decrease the power allocated to the display device and/or the peripheral device.

Additionally, the power allocator 508 can inform the peripheral device when actual power consumption of the display device and the peripheral device (e.g., the sum of the power consumption at the display device and the power consumption at the peripheral device) reaches the amount of power available from the first power supply 570 and/or the second power supply 572. For example, if the first power supply 570 and the second power supply 572 together provide 150 W of power and the display device consumes 60 W of power while the peripheral device consumes 90 W of power, the power allocator 508 sends a signal to the peripheral device power distributer indicating that power consumption has reached its limit. The peripheral device power distributer will adjust its power allocations within the peripheral device (e.g., slow down processing, stop charging the battery, etc.) to avoid exceeding the power allocation identified by the power allocator 508. The power allocator 508 does not limit the actual power provided to the peripheral device, but instead relies on the peripheral device to use no more power than that identified as allocated to it by the power allocator 508. In some examples where the peripheral device does consume more power than that allocated to it by the power allocator 508, the power allocator 508 stops providing power to the peripheral device if the actual power consumption of the display device and the peripheral device reaches the amount of power available from the first power supply 570 and/or the second power supply 572.

Figure 6:
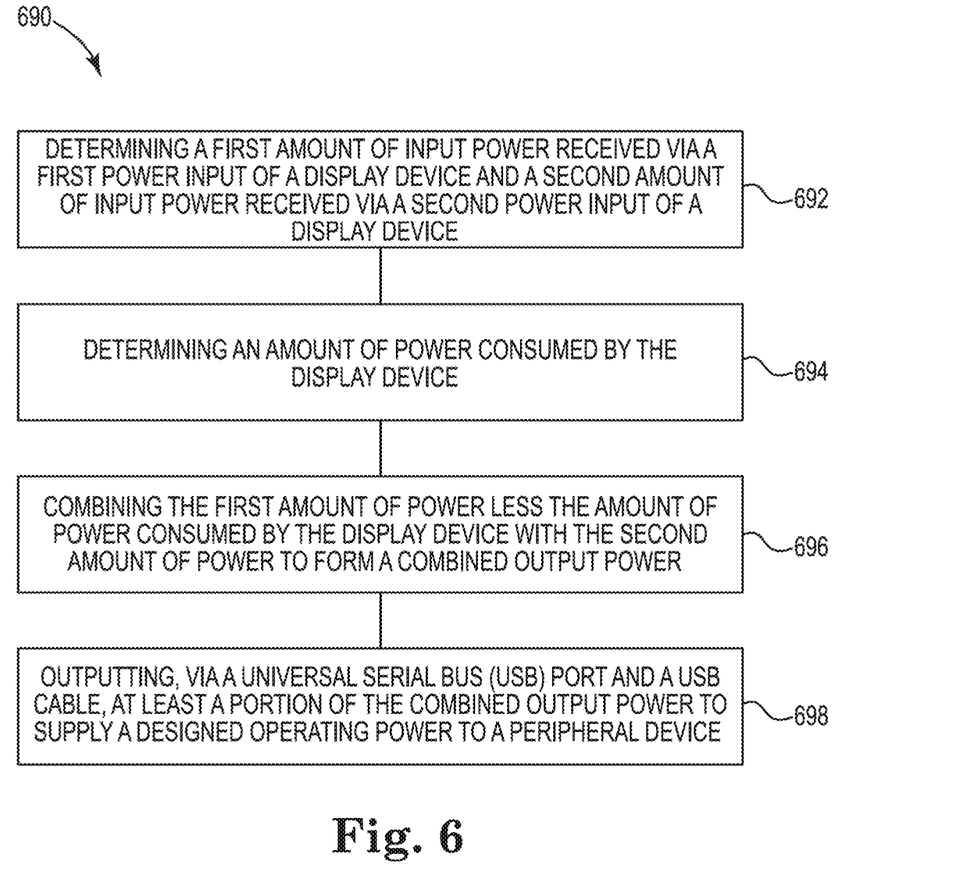
FIG. 6 illustrates a flow diagram of an example of a method suitable with a display device including power inputs in accordance with the disclosure.

FIG. 6 illustrates a flow diagram of an example of a method 690 suitable with a display device including power inputs in accordance with the disclosure. As illustrated at 692, the method 690 can include determining a first amount of input power received via a first power input of a display device and a second amount of input power received via a second power input of a display device, as described herein.

The method 690 can include determining an amount of power consumed by the display device, as illustrated at 694. For instance, each component such as a display, processor, graphics card, among other components included in the display device can consume a respective amount of power during operation of the display device. A power allocator can aggregate the respective power consumption of each component included in the display device to calculate an amount of power consumed by the display device. Stated differently, the sum of the respective power consumptions of the components of the display device is equal to the power consumption of the display device. Such calculation can occur in intervals, upon input from a user, or continuously, among other possibilities.

In some example, the method 690 can include combining the first amount of power less the amount of power consumed by the display device with the second amount of power to form a combined output power, as illustrated at 696. However, the disclosure is not so limited. Rather, in some examples, the method 690 can include combining the first amount of power with the second amount of power less the amount of power consumed by the display device to form a combined output power. In any case, the combined output power can be greater than or less than an amount of power consumed by the display device itself. However, in any case the display device is sufficiently powered such that the display device operates as intended when outputting power to a peripheral device.

As illustrated at 698, the method 690 can include outputting, via a USB port and a USB cable, at least a portion of the combined output power to supply a desired operating power to a peripheral device. For example, if the first power amount of input power is 15 Watts, the second amount of input power is 100 Watts, and the determined amount of power consumed by the display device is 10 Watts then the display device can input so or all or the combined output power of 105 Watts [15 Watts+100 Watts−10 Watts=105 Watts] to a peripheral device.

In some examples, the method 690 can include outputting the desired operating power of a peripheral device to the peripheral device solely via a USE connector and a USB cable. That is, in contrast to other approaches that may rely on a separate power cable in addition to a USB cable being coupled to a peripheral device the display device with power inputs can desirably provide the desired operating power of a peripheral device solely by a USB cable without employing a separate power cable coupled to the peripheral device.

The figures herein follow a numbering convention in which the first digit corresponds to the drawing figure number and the remaining digits identify an element or component in the drawing. For example, reference numeral 102 can refer to element "02" in FIG. 1 and an analogous and/or identical element can be identified by reference numeral 202 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It is understood that when an element is referred to as being "on," "connected to", "coupled to", or "coupled with" another element, it can be directly on, connected to, or coupled with the other element or intervening elements can be present. "Directly" coupled refers to being connected without intervening elements. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processing resource.

What is claimed:

1. A display device, comprising:
   a first power input to receive a first amount of input power;
   a second power input to receive a second amount of input power;
   a power allocator to:
      compare a voltage of the first amount of input power to a voltage of the second amount of input power;
      adjust the voltage of the first amount of input power or the voltage of the second amount of input power until the voltage of the first amount of input power is substantially equal to the voltage of the second amount of input power; and
      combine at least a portion of the first amount of power with at least a portion of the second amount of power to form a combined output power; and
   a universal serial bus (USB) port to output at least a portion of the combined output power to a peripheral device.

2. The display device of claim 1, wherein the first power input and second power input are alternative current to direct current (AC/DC) power inputs.

3. The display device of claim 1, wherein an amount of the combined output power is greater than the amount of the first input power.

4. The display device of claim 3, wherein the at least a portion of the combined output power to the peripheral device is greater than the amount of the first input power.

5. The display device of claim 1, wherein the first power input and the second power input are located on an external housing of the display device.

6. The display device of claim 1, wherein the USB port is a type-C USB port.

7. The display device of claim 1, wherein the display device does not include a battery.

8. The display device of claim 1, wherein the USB port includes circuitry to output DC power to the peripheral device when coupled to the peripheral device.

9. The display device of claim 1, wherein the first power input is separate and distinct from the second power input.

10. A non-transitory computer-readable medium comprising instructions executable by a processing resource to:
   determine a first amount of input power received via a first power input of a display device;
   determine a second amount of input power received via a second power input of the display device;
   compare a voltage of the first amount of input power to a voltage of the second amount of input power;
   adjust the voltage of the first amount of input power or the voltage of the second amount of input power until the voltage of the first amount of input power is substantially equal to the voltage of the second amount of input power;
   combine at least a portion of the first amount of power with at least a portion of the second amount of power to form a combined output power; and
   output at least a portion of the combined output power, via a universal serial bus (USB) port of the display device, to a peripheral device.

11. The non-transitory computer-readable medium of claim 10, further comprising instructions executable by the processing resource to:
   detect a type of peripheral device;
   determine a desired operating power of the peripheral device based on the determined type of peripheral device; and
   output the portion of the combined output power to that is equal to the desired operating power of the peripheral device.

12. A method, comprising:
- determining a first amount of input power received via a first power input of a display device and a second amount of input power received via a second power input of a display device;
- comparing a voltage of the first amount of input power to a voltage of the second amount of input power;
- adjusting the voltage of the first amount of input power or the voltage of the second amount of input power until the voltage of the first amount of input power is substantially equal to the voltage of the second amount of input power;
- determining an amount of power consumed by the display device;
- combining the first amount of power less the amount of power consumed by the display device with the second amount of power to form a combined output power; and
- outputting, via a universal serial bus (USB) port and a USB cable, at least a portion of the combined output power to supply a desired operating power to a peripheral device.

13. The method of claim 12, wherein outputting further comprises outputting the desired operating power to the peripheral device solely via the USB connector and the USB cable.

* * * * *